July 2, 1963
G. R. P. MARIÉ
3,096,473
MICROWAVE FREQUENCY CONVERTER
Filed Dec. 23, 1960
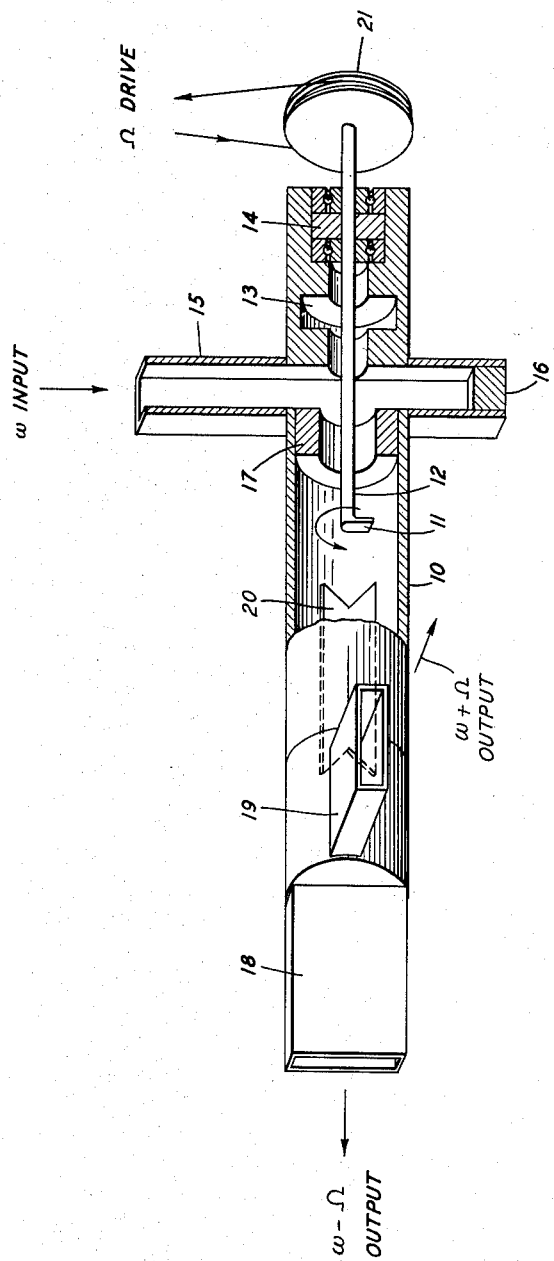
INVENTOR
G. R. P. MARIÉ
BY
ATTORNEY

United States Patent Office 3,096,473
Patented July 2, 1963

3,096,473
MICROWAVE FREQUENCY CONVERTER
Georges R. P. Marié, Rumson, N.J., assignor to Bell Telephone Laboratories, Incorporated, New York, N.Y., a corporation of New York
Filed Dec. 23, 1960, Ser. No. 78,078
3 Claims. (Cl. 321—69)

This invention relates to the electromagnetic wave modulators or frequency changing systems for wave energy in the microwave or higher frequency range and, more particularly, to a system for changing the frequency of a broadband, high frequency signal uniformly across the band by a small number of cycles per second.

There is a need in numerous types of measuring systems and in many kinds of radar systems for changing the frequency of a given high frequency signal by a small percentage. Viewed from a slightly different aspect, the high frequency signal is subjected to single side band modulation by a low frequency signal. From a still different aspect, the phase of the high frequency signal is continuously changed. For many years these functions have usually been performed by the continuous phase shifter or frequency changer disclosed by A. G. Fox in United States Patent 2,438,119, March 23, 1948, or in the Proceedings of the Institute of Radio Engineers, December 1947, page 1489. This device comprises a differential phase shifter mechanically rotated between transducers for converting linearly polarized waves to and from circularly polarized waves. A mechanical rotation of $\Omega$ will produce a frequency change of $2\Omega$. A typical measuring system employing such a frequency changer is described in the Bell Laboratories Record, December 1956, page 465. The differential phase shift section in such a phase shifter must be light and simple in order to spin at the high speeds required. In addition, it has an inherent frequency selectivity which limits the bandwidth which can be uniformly handled. Finally, even with the best design, a large frequency shift is mechanically difficult to obtain and with low frequencies this difficulty is increased by the increased size of the components.

It is, therefore, an object of the present invention to increase the frequency band of and to increase the amount of frequency change or phase shift obtainable with mechanically driven phase and frequency changers.

This and other objects are accomplished in accordance with the present invention as illustrated by the specific embodiment described herein by mechanically rotating a dipole antenna at an angular velocity of $\Omega$. If this antenna is excited by linearly polarized wave energy of the frequency $\omega$, analysis has shown that the complicated wave form thus produced includes the upper and lower side bands $\Omega+\omega$ and $\Omega-\omega$ as respectively oppositely rotating circularly polarized waves. Means including a static differential phase shift element are provided for separating these oppositely rotating components thus producing, not only a wave of frequency increased or decreased by a small amount, but simultaneously producing both waves as required in some double detection measuring systems. Since this phase shift element is static, it may be designed to be much more stable, broadband and in all respects of higher quality than the spinning one employed in the prior art. Other means for producing the above-described waveform are disclosed and specifically claimed in my application, Serial No. 78,079, filed on an even date herewith.

The various objects, features and advantages of the invention will appear more fully upon consideration of the following detailed description taken in connection with the illustrative drawing which shows a cut-away perspective view of an embodiment in accordance with the invention.

Referring more particularly to the FIGURE, the illustrative embodiment of the frequency changer in accordance with the invention is seen to comprise a section 10 of conductively bounded wave guide adapted to support linearly polarized electromagnetic wave energy in a multiplicity of polarizations and, therefore, capable of supporting circularly polarized waves. As illustrated, guide 10 is of circular cross-section but it might also be square. In either case, guide 10 has transverse dimensions sufficiently small to support only the dominant mode of a linearly polarized wave in at least two cross-polarizations. Disposed in the upper end of guide 10 is a dipole radiating element 11 connected to an axial shaft 12 so arranged that dipole 11 can be rotated by shaft 12 in a plane normal to the axis of guide 10. Shaft 12 extends upward through a conventional quarter-wave wave trap 13 which blocks the propagation of wave energy along shaft 12, through a suitable bearing 14 to terminate in a pulley 21 to which is supplied the angular drive of $\Omega$.

Guide 10 is joined in the region of shaft 12 by an axially intersecting section of rectangular dominant mode wave guide 15 having its electric plane dimension parallel to shaft 12. Guide 15 extends completely through guide 10 so that its stub end may be terminated by an adjustable conductive piston 16. In addition to providing the mechanical drive to dipole 11, shaft 12 serves as the inner conductor of a short section of coaxial line, the outer conductor of which comprises a bushing 17 inserted concentric to shaft 12 within guide 10, to provide the coupling between guide 15 and dipole 11. Thus, the dimensions of bushing 17 and the position of piston 16 within guide 15 are selected to match wave energy supplied by guide 15 to coaxial line 12—17 and, in turn, to dipole 11.

The lower end of guide 10 is terminated in a suitable pair of polarization selective branches by which wave energy in orthogonal linearly polarized modes may be separately coupled from guide 10. Specifically, guide 10 is coaxially joined by a first rectangular wave guide 18 of dimensions which will support wave energy polarized in a plane normal to the plane of the paper. At substantially the same location, guide 10 is joined by a second rectangular wave guide 19 perpendicular to both guides 10 and 18 which will accept only wave energy polarized parallel to the plane in the paper. The junction between guides 10 and 19 is illustrated as an H-plane or shunt junction but it could obviously be an E-plane junction as well. Conventional matching means not shown may be employed to facilitate the transition of the selected polarization of wave energy from guide 10 into either guides 18 and 19. Typical matching means are disclosed in United States Patent 2,682,610 granted June 29, 1954, to A. P. King.

Disposed between dipole 11 and guides 18 and 19 in guide 10 is suitable means for producing a conversion between circularly polarized wave energy supportable in guide 10 and linearly polarized wave energy. This means may be a 90 degree differential phase shift section of any of the types disclosed, for example, in "Principles and Applications of Waveguide Transmission" by G. C. Southworth, 1950, pages 327 to 331. By way of specific illustration, the phase shift section comprises a diametrical vane 20 of dielectric material lying in a plane which is inclined at 45 degrees to the polarizations accepted by guides 18 and 19. As is well known, if the length of vane 20 is such that a 90 degree phase shift is introduced to wave energy polarized parallel to the plane of vane 20 relative to wave energy polarized perpendicular to the plane of the vane, circularly polarized wave energy rotating in one sense in guide 10 is converted into linearly polarized wave energy in the proper polarization to be accepted by guide 18. Similarly, circularly polarized wave energy rotating in the opposite sense in guide 10 is converted into linearly polarized energy of the proper polarization to be accepted by guide 19.

In operation, a source of wave energy of angular frequency $\omega$ is coupled to guide 15, and dipole 11 radiates linearly polarized $TE_{11}$ mode energy at this frequency. However, the polarity of radiation turns in space with the dipole at the angular frequency $\Omega$ so that the resulting wave in guide 10 is actually neither a linearly polarized wave nor a circularly polarized wave. Rather it is an extremely complicated wave which has orthogonal electric field components normal to the direction of propagation which are, respectively, the real and imaginative parts of the expression:

$$\cos \omega t e^{j\Omega t}$$

This expression may be written:

$$2 \cos \omega t e^{j\Omega t} = e^{j(\omega+\Omega)t} + e^{-j(\omega-\Omega)t}$$

which shows that the wave includes two circularly polarized waves of $\omega+\Omega$ and $\omega-\Omega$ angular frequencies turning in opposite directions.

When each of these circularly polarized wave components is subjected to the 90 degree differential phase shift of vane 20, it is converted into a linearly polarized wave, polarized at an angle of 45 degrees to the plane of the vane. Thus, when the composite wave is applied to vane 20, it is resolved into two orthogonal components which are received in guides 18 and 19, representing, respectively, the original wave decreased in frequency by $\Omega$ and increased in frequency by $\Omega$. No filtering or balancing has been required to separate these waves and each may be utilized separately, the other being terminated, or they may be used simultaneously as required in some double detection systems.

In all cases it is to be understood that the above-described arrangement is merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, a source of electromagnetic wave energy of frequency $\omega$, means for launching said energy in each of a multiplicity of polarizations consecutively at an angular rate of $\Omega$, means for converting oppositely rotating circularly polarized wave components of said launched energy into linearly polarized waves of frequencies $\omega+\Omega$ and $\omega-\Omega$, respectively, and means for separating said linearly polarized waves.

2. In combination, means for supporting electromagnetic wave energy in a multiplicity of linearly polarized polarizations, means for launching said energy consecutively in successive ones of said polarizations for propagation along said supporting means comprising a dipole radiating element disposed within said supporting means, means for rotating said dipole in a plane normal to said direction of propagation, means included in said supporting means for a converting oppositely rotating circularly polarized waves therein into respective linearly polarized waves, and means for separating said linearly polarized waves.

3. In combination, a section of wave guide of circular cross-section, a radiating element disposed within said guide and adapted for rotation in a plane normal to the axis of said guide, a pair of orthogonal polarization selective connections to said guide, and means interposed in said guide between said radiating element and said connections for converting wave energy of circular polarization into wave energy of linear polarization.

References Cited in the file of this patent
UNITED STATES PATENTS 2,599,905    Fano _____ June 10, 1952